(12) United States Patent
Latheef et al.

(10) Patent No.: US 11,665,603 B2
(45) Date of Patent: May 30, 2023

(54) METHOD FOR HANDLING CONDITIONAL CONFIGURATION STORED IN UE

(71) Applicant: Samsung Electronics Co., Ltd., Suwon-si (KR)

(72) Inventors: Fasil Abdul Latheef, Bangalore (IN); Mangesh Abhimanyu Ingale, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/225,945

(22) Filed: Apr. 8, 2021

(65) Prior Publication Data

US 2021/0321310 A1 Oct. 14, 2021

(30) Foreign Application Priority Data

Apr. 9, 2020 (IN) .............................. 202041015600
Sep. 11, 2020 (IN) .............................. 202041015600

(51) Int. Cl.
*H04W 36/00* (2009.01)
*H04W 76/30* (2018.01)

(52) U.S. Cl.
CPC . *H04W 36/00837* (2018.08); *H04W 36/0058* (2018.08); *H04W 36/0077* (2013.01); *H04W 76/30* (2018.02)

(58) Field of Classification Search
CPC ............. H04W 76/30; H04W 36/0069; H04W 36/0059; H04W 76/34; H04W 36/36; H04W 36/0077; H04W 36/00837
See application file for complete search history.

(56) References Cited

U.S. PATENT DOCUMENTS

| 10,849,150 B2 | 11/2020 | Dinan | |
| 2014/0171091 A1* | 6/2014 | Cai | H04W 76/15 |
| | | | 455/450 |

(Continued)

FOREIGN PATENT DOCUMENTS

| WO | 2015142105 A1 | 9/2015 |
| WO | 2016021849 A1 | 2/2016 |

(Continued)

OTHER PUBLICATIONS

International Search Report and Written Opinion of the International Searching Authority in connection with International Application No. PCT/KR2021/004402 dated Jul. 6, 2021, 8 pages.

(Continued)

*Primary Examiner* — Anez C Ebrahim (57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. In an embodiment, a method performed by a UE is provided. The method comprises receiving, from a first base station connected with the UE, a first message for configuring a second base station; receiving, from the second base station, a second message including conditional primary secondary cell (PSCell) change (CPC) configuration including at least one configuration for at least one candidate PSCell and at least one condition to trigger an execution of CPC for each of the at least one candidate PSCell; storing the CPC configuration and in case that a third message for (Continued)

releasing a secondary cell group of the second base station is received from the first base station, releasing the stored CPC configuration.

12 Claims, 8 Drawing Sheets

(56) References Cited

U.S. PATENT DOCUMENTS

| | | | |
|---|---|---|---|
| 2015/0271713 A1 | 9/2015 | Kim et al. | |
| 2016/0044743 A1 | 2/2016 | Xu et al. | |
| 2018/0270895 A1 | 9/2018 | Park et al. | |
| 2022/0078683 A1* | 3/2022 | Eklöf | H04W 36/00837 |

FOREIGN PATENT DOCUMENTS

| | | |
|---|---|---|
| WO | 2018170516 A2 | 9/2018 |
| WO | 2019160281 A1 | 8/2019 |

OTHER PUBLICATIONS

CATT (Rapporteur), "Report on email discussion [108#67] [NR Mob] Resolving open issues in CPAC and creating TP (CATT)", R2-2000900, 3GPP TSG-RAN WG2 Meeting #109 electronic, Elbonia, Feb. 24-Mar. 6, 2020, 18 pages.

Intel Corporation, "Introduction of NR mobility enhancement", R2-2001767, 3GPP TSG-RAN WG2 Meeting #109 electronic, Elbonia, Feb. 24-Mar. 6, 2020, 523 pages.

CATT, "Introduction of Conditional PSCell Change for intra-SN without MN involvement", R2-2002237, 3GPP TSG-RAN2 Meeting #109 electronic, Elbonia, Feb. 24-Mar. 6, 2020, 13 pages.

Examination report dated Jan. 5, 2022, in connection with Indian Application No. 202041015600, 6 pages.

Qualcomm Incorporated, "Remaining issues on RRC message handling for conditional intra-SN PSCell change without MN involvement", 3GPP TSG-RAN WG2 Meeting #109 Feb. 24-Mar. 6, 2020, R2-2001151, 3 pages.

Intel Corporation, "NR Mobility Enhancements", 3GPP TSG RAN meeting #87e, Mar. 16-19, 2020, RP-200461, 21 pages.

Supplementary European Search Report dated Dec. 8, 2022 in connection with European Patent Application No. 21 78 4761, 11 pages.

* cited by examiner

METHOD FOR HANDLING CONDITIONAL CONFIGURATION STORED IN UE

CROSS-REFERENCE TO RELATED APPLICATIONS

This application is based on and claims priority under 35 U.S.C. § 119(a) of an Indian Provisional patent application number 202041015600 filed on Apr. 9, 2020, in the Indian Patent Office, and an Indian Non-Provisional patent application number 202041015600, filed on Sep. 11, 2020, in the Indian Patent Office, the disclosure of each of which is incorporated by reference herein in its entirety.

BACKGROUND

1. Field

The present disclosure relates to a wireless communication system, and more specifically related to a method and a user equipment (UE) to handle conditional configuration stored in the UE in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A Fifth generation (5G) communication system (i.e., New Radio (NR)) is being developed in order to meet a growing need for broadband with Enhanced Mobile Broadband (eMBB) while also supporting new use cases like Ultra-Reliable Low Latency Commination (URLLC) and Massive Machine Type Communication (mMTC). The NR is an orthogonal frequency-division multiplexing (OFDM)-based air interface designed to support a wide variation of 5G device-types, services, deployments and spectrum. A network monitors a UE behavior and provides necessary resources to the UE to perform any operation that the UE requires. The operation can be, for example, but not limited to, a data uplink, a data downlink, and calls. A signal strength and quality experienced by the UE varies according to a proximity of the UE with a next generation node B (i.e., gNB). The UE's near a cell are expected to have a better signal condition compared to the ones which are far from the gNB i.e., cell edge situation.

Further, a radio access network (RAN) Node or the gNB in the NR/an eNB in a Long-Term Evolution (LTE) always maintains a context on the UE that are in an active Radio Resource Connection (RRC) connection with it. At any point of time, the gNB can handover a mobile device/ the UE from its control (i.e., source cell) to another gNB or another cell (i.e., target cell), thus transferring an entire context of the UE to the target cell. This decision is taken by the network optionally based on assistance information received from the UE, with the help of measurement reports about neighbor cells. In other words, the gNB configures the UE to measure the signal condition of the serving cell and neighboring cells that may belong to a different gNB. There is a specific measurement criterion, and a specific reporting criterion, both of which are configured by the serving gNB. Due to various reasons like weak signal condition, heavy load on serving gNB etc., the serving gNB can handover the UE to the neighbor cell or the target gNB and this could be done based on the assistance information received from the UE in form of measurement reports.

In the NR, a conditional handover (CHO) and a conditional PSCell change (CPC) are introduced. In CHO, the network provides a candidate target PCell configurations to the UE first, along with a condition for evaluating these candidates. Once the configured condition is satisfied for any candidate cell, then the conditional handover to this candidate cell is executed. Similarly, for the CPC, a secondary node (SN) provides the candidate target PSCell configurations to the UE first, along with a condition for evaluating these candidates. Once the configured condition is satisfied for any candidate cell, then the conditional PSCell change to this candidate cell is executed.

Thus, it is desired to address the shortcomings or at least provide a useful alternative.

SUMMARY

For a more efficient communication system, there is a need for a method for handle conditional configuration stored in a UE.

Accordingly, embodiments of the present disclosure disclose a method for handling a conditional configuration stored in a UE. The method includes receiving, by the UE, a radio resource control (RRC) message indicating a release of a secondary cell group (SCG) from a master node (MN). Further, the method includes releasing, by the UE, at least one of a stored conditional PSCell change (CPC) configuration and a variable storing a CPC configuration in response to receiving the RRC message indicating the release of the SCG.

In an embodiment, the method further includes detecting, by the UE, at least one measurement identifier associated with the stored CPC configuration, and removing, by the UE, the at least one measurement identifier associated with the stored CPC configuration in response to releasing the stored CPC configuration.

In an embodiment, the method further includes determining, by the UE, whether a report configuration has a report type set to a conditional trigger configuration for each of at least one measurement identifier of a source special cell (SpCell) configuration, and removing, by the UE, a report configuration with a matching report configuration identifier from a report configuration list within a VarMeasConfig for a report configuration identifier.

In an embodiment, the method further includes removing, by the UE, a measurement object with a matching measurement object identifier (measObjectId) from a measurement object list (measObjectList) within a VarMeasConfig, if a measObjectId is only associated to a report configuration (reportConfig) with a report type set to a conditional trigger configuration (condTriggerConfig).

In an embodiment, the method further includes removing, by the UE, a measurement identifier with a matching measurement identifier from a measurement identifier list within a VarMeasConfig.

In an embodiment, the method further includes releasing, by the UE, a measurement object associated with a CPC in response to releasing the stored CPC configuration.

In an embodiment, the measurement object comprise at least one of a frequency to be monitored, a cell list to be monitored, cell information, and frequency offset information.

In an embodiment, the release of the SCG is received without network explicitly asking the UE to release the stored CPC configuration.

In an embodiment, at least one of the stored CPC configuration or the variable storing the CPC configuration, on the UE, is released autonomously.

In an embodiment, the MN is one of an evolved UMTS terrestrial radio access network (E-UTRA) and a new radio (NR) network.

In an embodiment, a method performed by a UE is provided. The method comprises: receiving, from a first base station connected with the UE, a first message for configuring a second base station; receiving, from the second base station, a second message including conditional primary secondary cell (PSCell) change (CPC) configuration including at least one configuration for at least one candidate PSCell and at least one condition to trigger an execution of CPC for each of the at least one candidate PSCell; storing the CPC configuration; and in case that a third message for releasing a secondary cell group of the second base station is received from the first base station, releasing the stored CPC configuration.

In an embodiment, a UE is provided. The UE comprises: a transceiver; and a controller coupled with the transceiver and configured to: receive, from a first base station connected with the UE, a first message for configuring a second base station, receive, from the second base station, a second message including conditional primary secondary cell (PSCell) change (CPC) configuration including at least one configuration for at least one candidate PSCell and at least one condition to trigger an execution of CPC for each of the at least one candidate PSCell, store the CPC configuration, and in case that a third message for releasing a secondary cell group of the second base station is received from the first base station, release the stored CPC configuration.

Accordingly, the embodiments of the present disclosure provide a UE for handling a conditional configuration stored in the UE. The UE includes a processor coupled with a memory. The processor is configured to receive an RRC message indicating a release of a SCG from an MN. Further, the processor is configured to release at least one of a stored CPC configuration and a variable storing a CPC configuration in response to receiving the RRC message indicating the release of the SCG.

These and other aspects of the embodiments of the present disclosures will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The principal object of the embodiments herein is to provide a method for handle conditional configuration stored in a UE and conditional failures, so that the UE does not have an ambiguity about the CHO configuration.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The present disclosure is illustrated in the accompanying drawings, throughout which like reference letters indicate corresponding parts in the various figures. The embodiments herein will be better understood from the following description with reference to the drawings, in which.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method for handling a conditional configuration stored in a UE. The method includes receiving, by the UE, an RRC message indicating a release of a SCG from an MN. Further, the method includes releasing, by the UE, at least one of a stored CPC configuration and a variable storing a CPC configuration in response to receiving the RRC message indicating the release of the SCG.

Referring now to the drawings, and more particularly to FIGS. 2 through 6, there are shown preferred embodiments.

Figure 1:
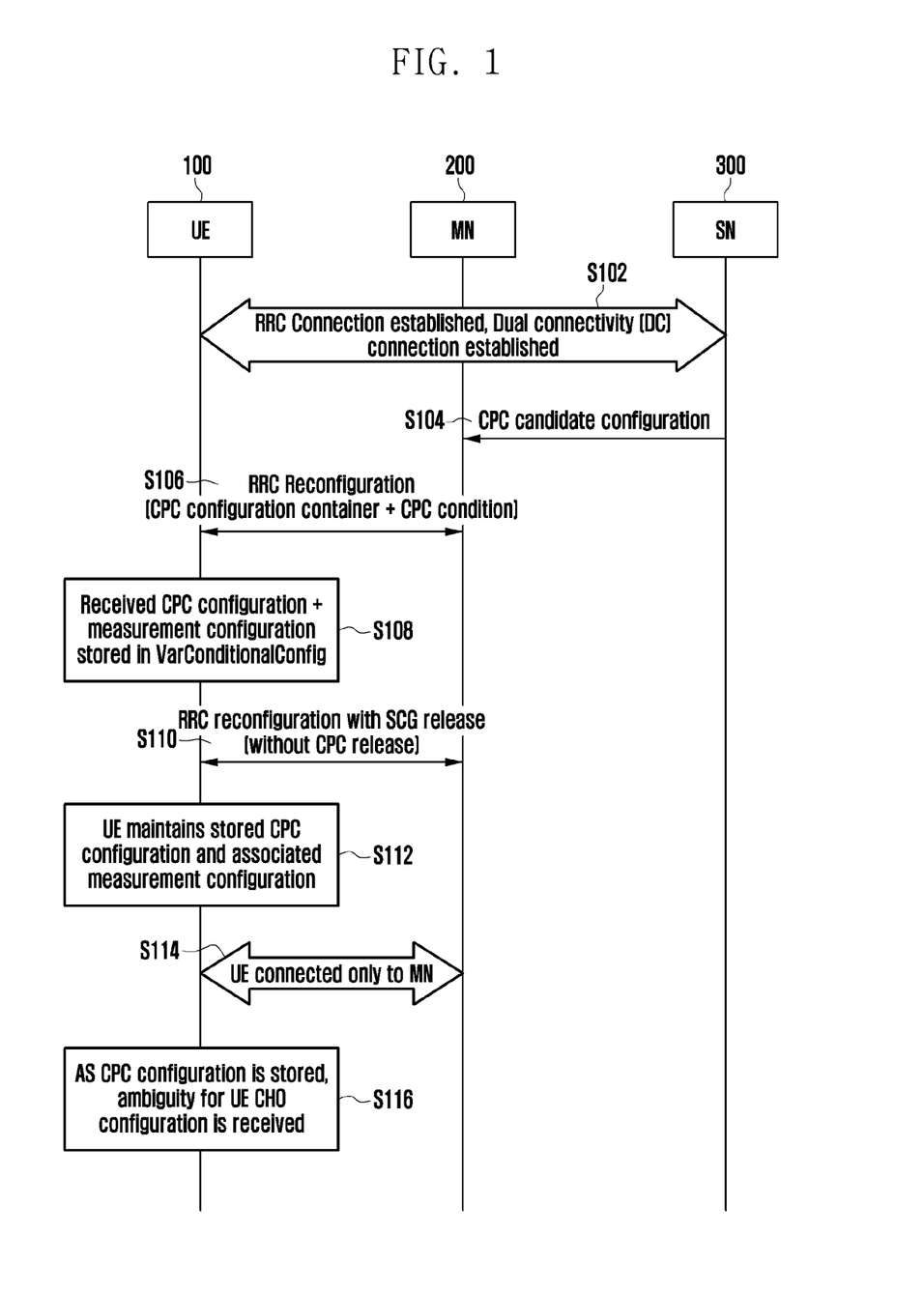
FIG. 1 is a sequence diagram illustrating in which a UE retains the stored CPC configuration and corresponding measurement configuration upon receiving SCG release without CPC release from a network.

FIG. 1 is a sequence diagram illustrating in which a UE (100) retains a stored CPC configuration and corresponding measurement configuration upon receiving SCG release without CPC release from a network, according to the prior art.

Method to handle the UE stored CPC configuration on event of SCG release.

In the conventional method, for a UE behavior when the UE (100) configured with a CHO is sent to an RRC_INACTIVE state i.e., the CHO configured UE is sent an RRC release message with suspend configuration which transition the UE state from an RRC_CONNECTED state to an RRC_INACTIVE state is already captured in the specification of the 3GPP TS 38.331 v16.0.0. When the RRC release message is received by the UE (100) with the stored CHO configuration, the UE (100) may autonomously release the CHO configuration upon entering RRC_INACTIVE state. However, the handling of CPC configuration when SCG is released by the network has not been discussed in the 3GPP specification. Further, it is already agreed that the CPC configuration stored in the UE (100) is released on successful CPC execution or successful conventional PSCell change.

Similar to the CHO, the UE (100) stored CPC configuration and the linked measurement configuration is released on successful execution of the CPC or on the successful completion of a conventional PSCell change. The UE (100) stored conditional configuration is also released on entering the RRC IDLE or the RRC_INACTIVE state. However, with respect to a RAN2, the handling of UE (100) stored CPC configuration on the event of the SCG release has not been discussed in the 3GPP specification.

The CPC configuration is limited to intra-SN conditional PSCell change and is configured to the UE (100) by the SN without MN involvement. When the SCG is released, the UE (100) resets a SCG medium access control (MAC), releases all radio link control (RLC) entities on the SCG and releases a SCG bearer. Only the radio bearer configuration may still be retained. The UE (100) is now only connected to MCG and the radio bearers may either be released or reconfigured by the MCG. In such a state, there is no benefit from the stored CPC configuration.

As provisioned in current 3GPP specification TS 38.331 v16.0.0, the CPC configuration stored in the UE (100) is retained and not released when the SCG is released. This leads to a scenario where the UE (100) is no longer in a multi-radio dual connectivity (MR-DC) but still maintains the conditional configuration for the PSCell change. Since simultaneous configuration of the CHO and the CPC cannot be provided to the UE (100), there is only one variable defined for storing the conditional configuration. Therefore, the received configuration is stored in a common variable i.e., the CPC and the CHO configurations are stored in a VarConditionalConfig. Therefore, the received configuration creates ambiguity to the UE (100) if the stored CPC configuration is retained after the SCG is released. This may even lead to UE (100) treating a future CHO configuration from MN (200) as an invalid configuration because it already has a stored CPC configuration. Therefore, the UE (100) stored CPC configuration has to be released when the NR SCG is released. Additionally, measID and reportConfig associated with CPC config, and measObject(s) only associated to CPC may be removed when the SCG is released (as explained in the FIG. 2).

As shown in the FIG. 1, at S102, the RRC connection is established between the UE (100) and a SN (300), and a dual connectivity (DC) connection is established between the UE (100) and the SN (300). At S104, the SN (300) sends a CPC candidate configuration to the MN (200). At S106, an RRC reconfiguration including a CPC configuration container and a CPC condition is shared between the UE (100) and the MN (200). At S108, the UE (100) receives the CPC configuration along with measurement configuration stored in a VarConditionalConfig. At S110, the RRC reconfiguration with the SCG release without a CPC release is shared between the UE (100) and the MN (200). At S112, the UE (100) maintains the stored CPC configuration and associated measurement configuration. At S114, the UE (100) is connected only to the MN (200). At S116, as the CPC configuration is stored, ambiguity for the UE about the CHO configuration.

Figure 2:
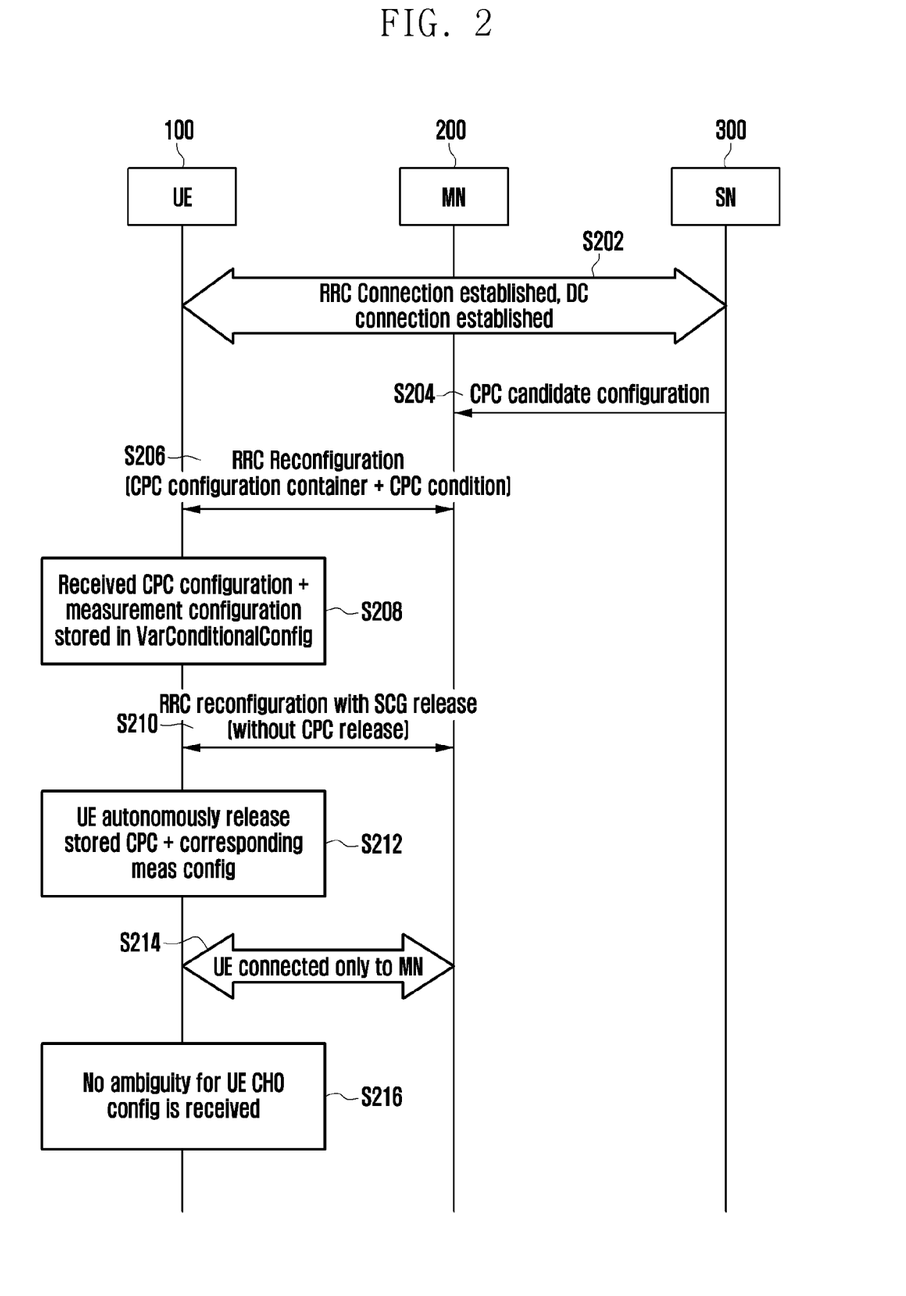
FIG. 2 is a sequence diagram illustrating a provided method in which the UE autonomously clears the stored CPC configuration and corresponding measurement configuration upon receiving the SCG release without CPC release from the network according to embodiments of the present disclosure.

FIG. 2 is a sequence diagram illustrating a provided method in which the UE (100) autonomously clears the stored CPC configuration and corresponding measurement configuration upon receiving SCG release without CPC release from the network according to embodiments of the present disclosure.

At S202, the RRC connection is established between the UE (100) and the SN (300) and the DC connection is established between the UE (100) and the SN (300). At S204, the SN (300) sends the CPC candidate configuration to the MN (200). At S206, an RRC reconfiguration including the CPC configuration container and the CPC condition is shared between the UE (100) and the MN (200). At S208, the UE (100) receives the CPC configuration along with measurement configuration stored in the VarConditionalConfig. At S210, the RRC reconfiguration with SCG release without the CPC release is shared between the UE (100) and the MN (200). At S212, the UE (100) autonomously release the stored CPC along with the measurement configuration. At S214, the UE (100) is connected only to the MN (200). At S216, the UE (100) does not have the ambiguity about the CHO configuration.

In an example, when the SCG is released, the UE (100) autonomously releases the stored CPC configuration. Further, measID and reportConfig associated with the CPC config, and measObject(s) only associated to CPC may be removed by the UE (100) when SCG is released. The changes to specification for implementing these embodiments are illustrated below.

TABLE 1

The UE (100) may:
   1> as a result of SCG release triggered by E-UTRA
   (i.e., (NG) EN-DC case) or NR (i.e., NR-DC case):
      2> reset SCG MAC, if configured;
      2> for each RLC bearer that is part of the SCG configuration:
         3> perform RLC bearer release procedure as specified in
           5.3.5.5.3;
      2> release the SCG configuration;
      2> if CPC was configured,
         3> remove all the entries within VarConditionalConfig, if
           any;
         3> for each measId of the source SpCell configuration, if
           the associated reportConfig has a reportType set to
           condTriggerConfig:
           4> for the associated reportConfigId:
              5> remove the entry with the matching
                 reportConfigId from the reportConfigList
                 within the VarMeasConfig;
           4> if the associated measObjectId is only associated to
             a reportConfig with reportType set
             to cho-TriggerConfig:
             5> remove the entry with the matching
                measObjectId from the measObjectList
                within the VarMeasConfig;
           4> remove the entry with the matching measId
             from the measIdList within the VarMeasConfig;
      2> stop timer T310 for the corresponding SpCell, if running;
      2> stop timer T312 for the corresponding SpCell, if running;
      2> stop timer T304 for the corresponding SpCell, if running.

Meanwhile, the operations of the UE described above are merely examples, and the present disclosure is not limited thereto. That is, some of the above operations may be omitted or may be performed simultaneously.

Release of cell group means only release of the lower layer configuration of the cell group but the RadioBearerConfig may not be released.

Further, there are 2 configurations associated to the CHO:
1. Measurement configuration:
   a. measurement objects,
   b. report configuration, and
   c. Measurement ID linking the measurement objects and report configuration;
2. Conditional configuration per candidate cell.

Upon receiving CHO/CPC configuration, the UE (100) stores one entry per candidate cell. The entry is identified using the CHO id signaled by BS. Each entry consist of conditional configuration for a candidate, and the associated measurement configuration.

Figure 3:
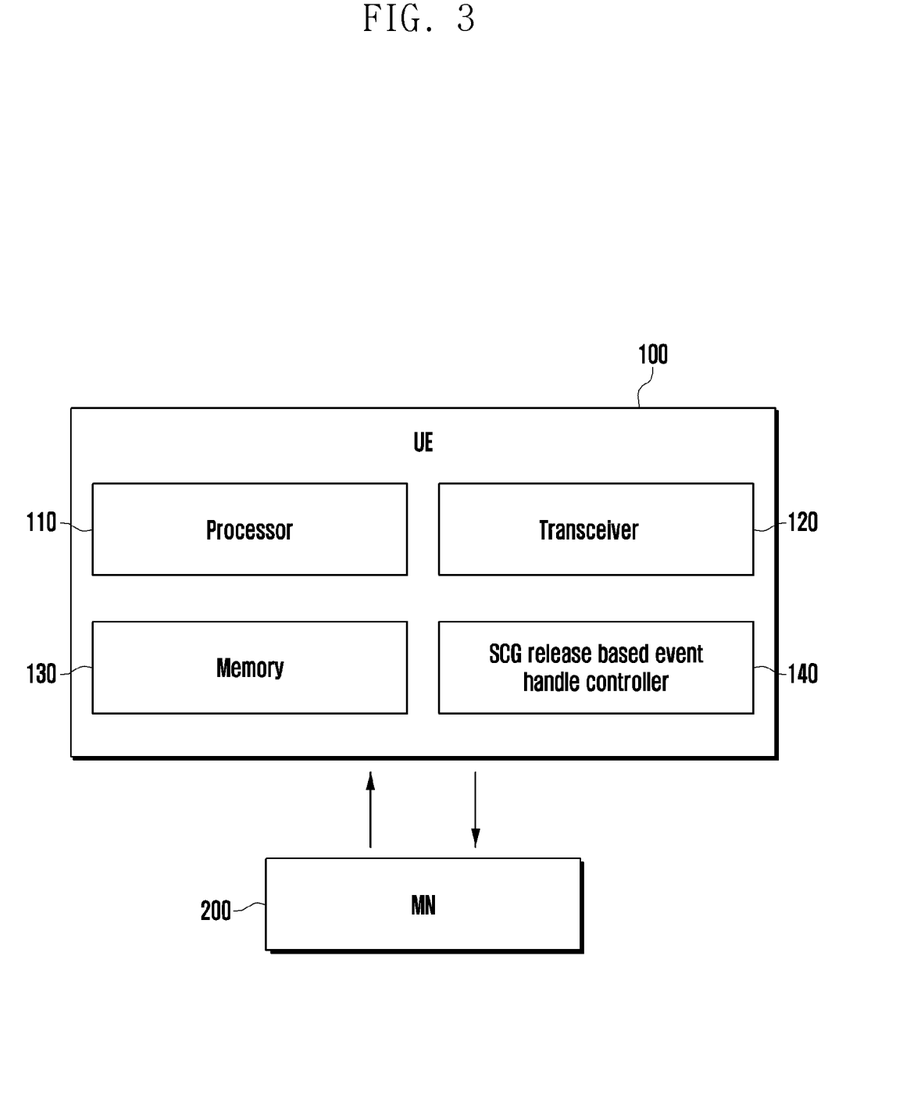
FIG. 3 illustrates an overview of a wireless communication system in which the UE autonomously removes the stored CPC configuration and corresponding measurement configuration upon receiving SCG release from the network according to embodiments of the present disclosure.

FIG. 3. illustrates an overview of a wireless communication system (300) in which the UE (100) autonomously removes the stored CPC configuration and corresponding measurement configuration upon receiving SCG release from the MN (200) according to embodiments of the present disclosure. The wireless communication system (1000) includes the UE (100) and the MN (200). The UE (100) can be, for example, but not limited to a cellular phone, a smart phone, a personal digital assistant (PDA), a tablet computer, a laptop computer, an Internet of Things (IoT), a virtual reality device and an immersive system. The UE (100) includes a processor (110), a transceiver (120), a memory (130), and a SCG release based event handle controller (140). The processor (110) is coupled with the transceiver (120), the memory (130) and the SCG release based event handle controller (140).

The SCG release based event handle controller (140) is configured to receive the RRC message indicating the release of the SCG from the MN (200). In an embodiment, the MN (200) is one of an evolved UMTS terrestrial radio access Network (E-UTRA) and a NR network. In response to receiving the RRC message indicating the release of the SCG, the SCG release based event handle controller (140) is configured to release a stored CPC configuration and a variable storing a CPC configuration. In an embodiment, the release of the SCG is received without network explicitly asking the UE (100) to release the stored CPC configuration. In an embodiment, the stored CPC configuration and the variable storing the CPC configuration, on the UE (100), are released autonomously.

In an embodiment, the SCG release based event handle controller (140) is configured to detect the measurement identifier associated with the stored CPC configuration and remove the measurement identifier associated with the stored CPC configuration in response to releasing the stored CPC configuration.

In another embodiment, for each of a measurement identifier of a source special cell (SpCell) configuration, the SCG release based event handle controller (140) is configured to determine whether a report configuration has a report type set to a conditional trigger configuration and remove a report configuration with a matching report configuration identifier from a report configuration list within a VarMeasConfig for a report configuration identifier.

In another embodiment, the SCG release based event handle controller (140) is configured to remove a measurement object with a matching measurement object identifier (measObjectId) from a measurement object list (measObjectList) within a VarMeasConfig, if a measObjectId is only associated to a report configuration (reportConfig) with a report type set to a conditional trigger configuration (condTriggerConfig). The measurement object can be, for example, but not limited to a frequency to be monitored, a cell list to be monitored, cell information, and frequency offset information.

In another embodiment, the SCG release based event handle controller (140) is configured to remove a measurement identifier with a matching measurement identifier from a measurement identifier list within a VarMeasConfig.

In another embodiment, the SCG release based event handle controller (140) is configured to release the measurement object associated with a CPC in response to releasing the stored CPC configuration.

The processor (110) is configured to execute instructions stored in the memory (130) and to perform various processes. The transceiver (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in random access memory (RAM) or cache).

Although the FIG. 3 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the disclosure. One or more components can be combined together to perform same or substantially similar function to handle the conditional configuration stored in the UE (100).

Figure 4A:
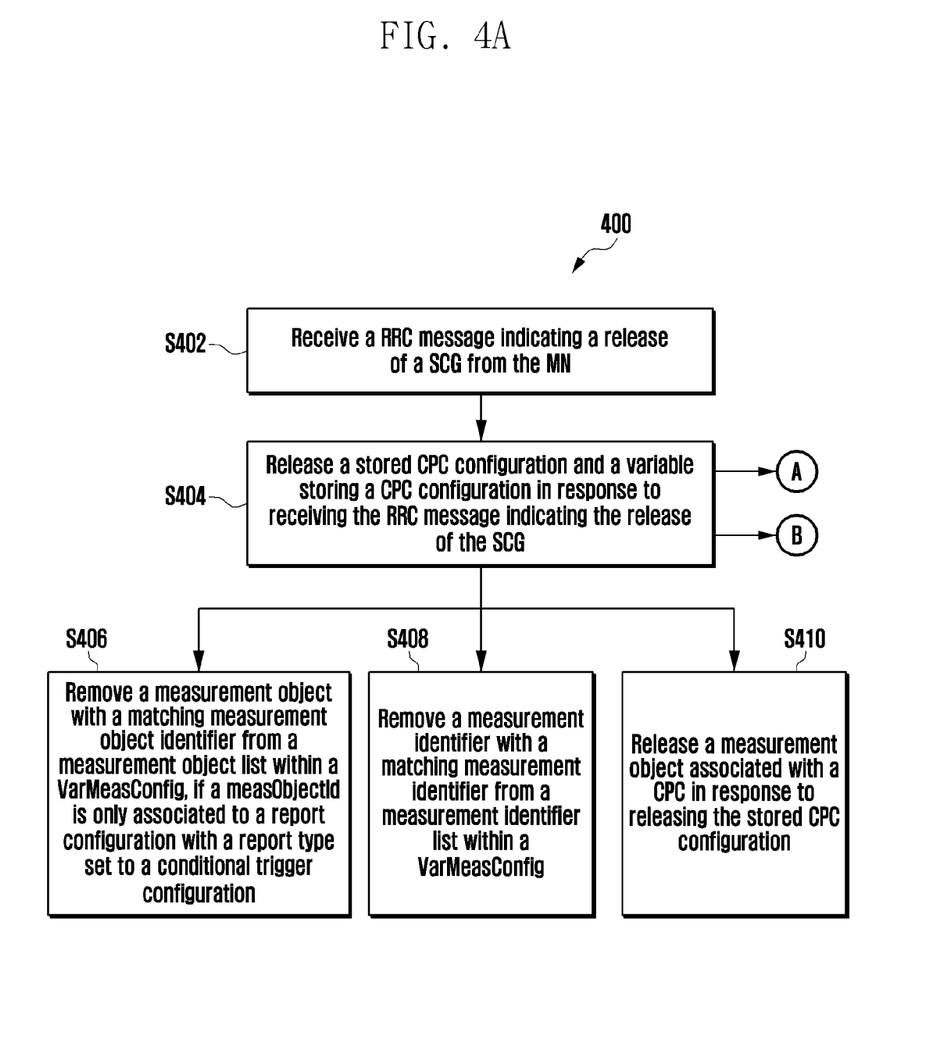
FIG. 4A is a flow chart illustrating a method for autonomously removing the stored CPC configuration and corresponding measurement configuration upon receiving SCG release from the network according to embodiments of the present disclosure.
Figure 4B:
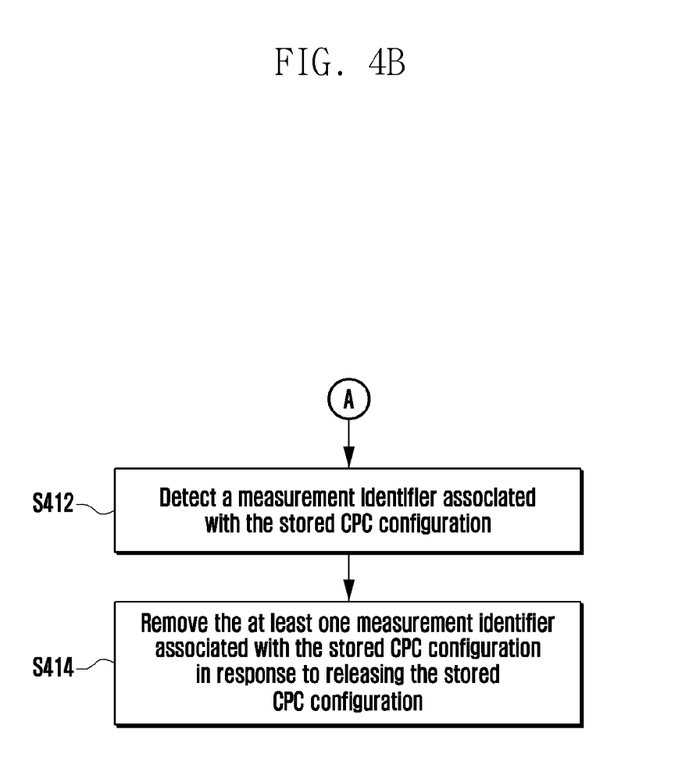
FIG. 4B is a flow chart illustrating a method for autonomously removing the stored CPC configuration and corresponding measurement configuration upon receiving SCG release from the network according to embodiments of the present disclosure.
Figure 4C:
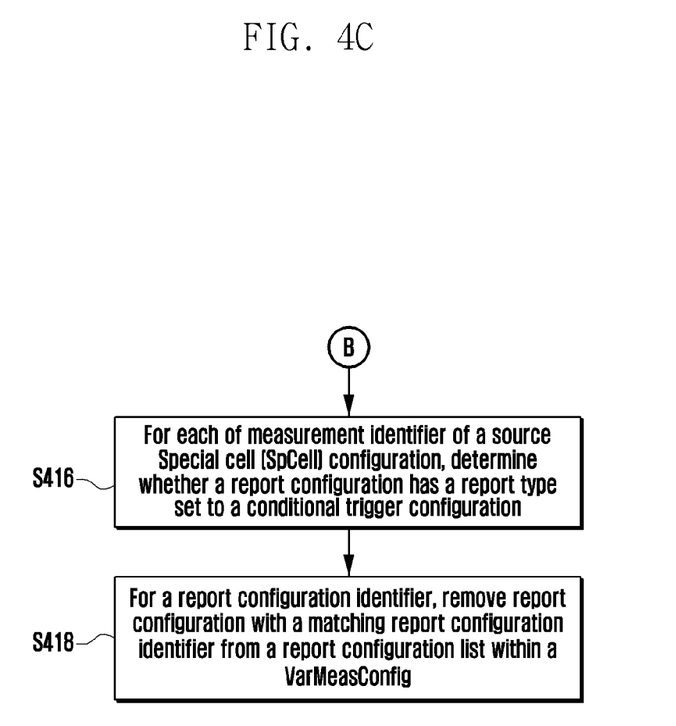
FIG. 4C is a flow chart illustrating a method for autonomously removing the stored CPC configuration and corresponding measurement configuration upon receiving SCG release from the network according to embodiments of the present disclosure.

FIGS. 4A through 4C are flow charts (S400) illustrating a method for autonomously removing the stored CPC configuration and corresponding measurement configuration upon receiving SCG release from the MN according to embodiments of the present disclosure. The operations (S402-S418) are performed by the SCG release based event handle controller (140).

At S402, the method includes receiving the RRC message indicating the release of the SCG from the MN (200). At S404, the method includes releasing the stored CPC configuration and the variable storing the CPC configuration in response to receiving the RRC message indicating the release of the SCG.

In an embodiment, at S406, the method includes removing the measurement object with the matching measurement object identifier from the measurement object list within the VarMeasConfig, if the measObjectId is only associated to the report configuration with the report type set to the conditional trigger configuration.

In another embodiment, at S408, the method includes removing the measurement identifier with the matching measurement identifier from the measurement identifier list within the VarMeasConfig.

In another embodiment, at S410, the method includes releasing the measurement object associated with the CPC in response to releasing the stored CPC configuration.

In another embodiment, at S412, the method includes detecting the measurement identifier associated with the stored CPC configuration. At S414, the method includes removing the at least one measurement identifier associated with the stored CPC configuration in response to releasing the stored CPC configuration.

In another embodiment, at S416, the method includes determining whether the report configuration has the report type set to the conditional trigger configuration for each of measurement identifier of a source special cell (SpCell) configuration. At S418, the method includes removing the report configuration with the matching report configuration identifier from a report configuration list within the VarMeasConfig for a report configuration identifier.

The various actions, acts, blocks, steps, or the like in the flow diagram (S400) may be performed in the order presented, in a different order or simultaneously. Further, in some embodiments, some of the actions, acts, blocks, steps, or the like may be omitted, added, modified, skipped, or the like without departing from the scope of the disclosure.

Method to perform the CHO failure recovery: in the CHO, the UE (100) may be configured with attemptCondReconfig-r16. If CHO failure occurs, or a normal handover failure occurs or a radio link failure is detected for the UE (100) configured with attemptCondReconfig-r160, if the cell selected for recovery while T311 is running belongs to a configured CHO candidate cell, then CHO is triggered to the selected cell. Otherwise, RRC reestablishment is triggered.

Further, there is also a case where the UE (100) in the NR-DC is configured to perform fast MCG recovery when the RLF is detected or PCell handover has failed. When configured, the UE (100) sends MCG failure information message via the SCG, to indicate to the network about failure on the MCG. Therefore, there could be a conflict between which procedure to be performed if the UE (100) is configured with both MCG failure recovery as well as attemptCondReconfig-r16.

One method is to restrict the network from providing both configurations to the UE (100). Since it is the same network node i.e., MN (200), that configured these to the UE (100), it can be ensured by the MN (200) that both are not simultaneously configured for the UE (100). However, this is in network control and a mechanism have to be defined on the UE (100) if both these are configured on the UE (100) simultaneously. In an embodiment, a CHO based recovery is prioritized and the UE (100) executes CHO on the selected cell. In this method, the MCG recovery using MCG failure information message is not initiated at all. In another aspect, the UE (100) is checked if the selection cell belongs to the list of candidate cells configured for the CHO. If selected cell is part of CHO configuration, then CHO is performed i.e., the CHO based recovery is performed. Otherwise, MCG failure recovery is performed i.e., MCG failure information is sent to SCG if the selected cell is not a configured CHO candidate.

Method to perform multiple CPC attempts prior to failure declaration: in most cases, the UE (100) will be configured with more than one candidate target cell for CPC. Except for T310 expiry i.e., RLF, the other common failures for PSCell change include T304 expiry. The UE (100) on fulfilling the execution condition(s) for a CPC target cell, initiated execution of CPC. T304 is started, a UE RF tunes to candidate target cell frequency and acquires the cell. Random access is initiated in order to send RRC reconfiguration complete message. If random access is not successful till T304 expiry, failure is declared.

Since there are more than one candidate cells configured to the UE (100), all these cells belong to the same gNB (i.e., intra-SN cells), it is highly likely that other candidate cells also fulfil the CPC execution condition. In an embodiment, the UE (100) attempts the CPC execution on all the candidate cells that has fulfilled the execution condition. If CPC execution to all these candidate cells fail, then SCG failure is declared. If CPC execution to any of these cells succeed, then the UE (100) successfully completes CPC and releases the stored CPC configuration and linked measurement configuration.

The UE (100) attempts random access to the candidate cell till expiry of T304. However, there is also a maximum number of preamble transmission that is configured to the UE (100). In an embodiment, the UE (100) attempts random access for CPC to a candidate cell only for the maximum number of preamble attempts that is configured to the UE (100). If the random access fails, but T304 is still running, then UE (100) attempts the CHO execution to the next cell and so on. The SCG failure is declared only when T304 expires and not when access to the first cell fails.

In another embodiment, a method can be used to handle the conditional failures. The method includes checking, by the UE, if a selected cell belongs to a list of candidate cells configured for the CHO. If the selected cell is part of the CHO configuration, then the CHO is performed i.e., the CHO based recovery is performed. Otherwise, an MCG failure recovery is performed i.e., an MCG failure information is sent to the SCG if the selected cell is not a configured CHO candidate.

In another embodiment, a method can be used to perform multiple CPC attempts before declaring SCG failure. The method include the UE (100) attempting the CPC on all the candidate cells that has fulfilled the execution condition. If the CPC execution to all these candidate cells fail, then the SCG failure is declared. If the CPC execution to any of these cells succeed, then the UE (100) successfully completes CPC and releases the stored CPC configuration and linked measurement configuration. The method further includes the UE (100) attempting the random access for CPC to the candidate cell only for the maximum number of preamble attempts that is configured to the UE. If the random access fails, but T304 is still running, then the UE attempts CHO execution to the next cell and so on. SCG failure is declared only when T304 expires and not when access to the first cell fails.

The method can be used to prioritize the CHO based failure recovery over the fast MCG recovery. The method can be used to perform the CHO if the cell selected following MCG failure is the CHO candidate cell, otherwise perform MCG failure recovery. The method can be used to attempt CHO execution on all candidate cells that has fulfilled the execution condition. If access to all cells fail, SCG failure is declared. The method can be used to attempt CPC execution on another candidate that fulfils the execution condition, when maximum preamble attempts have failed on the selected candidate and T304 is still running.

Figure 5:
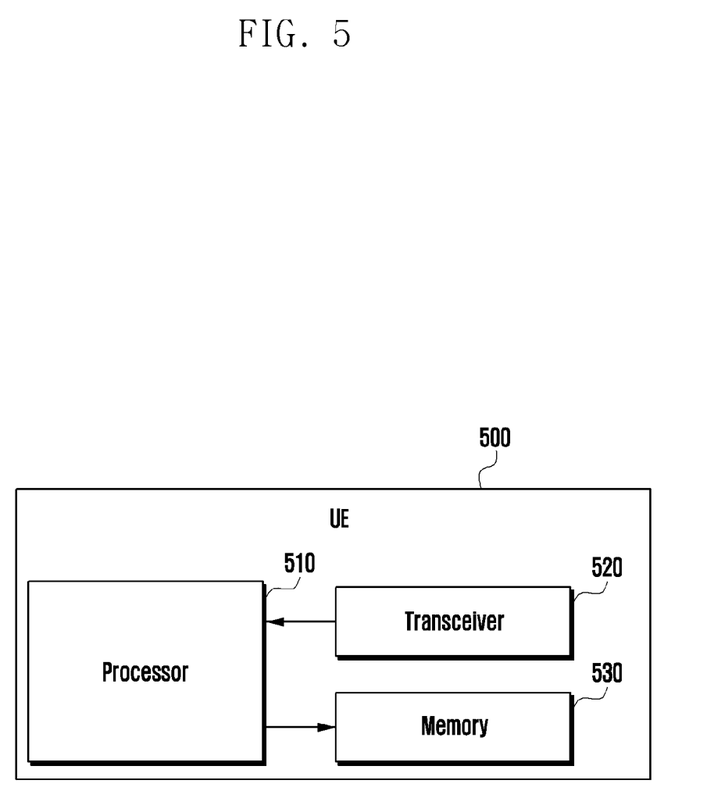
FIG. 5 illustrates a UE according to embodiments of the present disclosure.

FIG. 5 illustrates a UE according to embodiments of the present disclosure.

Referring to the FIG. 5, the UE (500) may include a processor (510), a transceiver (520) and a memory (530). However, all of the illustrated components are not essential. The UE (500) may be implemented by more or less components than those illustrated in FIG. 5. In addition, the processor (510) and the transceiver (520) and the memory (530) may be implemented as a single chip according to another embodiment.

The UE (500) may correspond to UE described above.

The aforementioned components will now be described in detail.

The processor (510) may include one or more processors or other processing devices that control the provided function, process, and/or method. An operation of the UE (500) may be implemented by the processor (510). The processor (510) may control a signal flow between each block to perform the provided function, process, and/or method according to the embodiments of the present disclosure.

The transceiver (520) may include an RF transmitter for up-converting and amplifying a transmitted signal, and an RF receiver for down-converting a frequency of a received signal. However, according to another embodiment, the transceiver (520) may be implemented by more or less components than those illustrated in components.

The transceiver (520) may be connected to the processor (510) and transmit and/or receive a signal. The signal may include control information and data. In addition, the transceiver (520) may receive the signal through a wireless channel and output the signal to the processor (510). The transceiver (520) may transmit a signal output from the processor (510) through the wireless channel.

The memory (530) may store the control information or the data included in a signal obtained by the UE (500). The memory (530) may be connected to the processor (510) and store at least one instruction or a protocol or a parameter for the provided function, process, and/or method. The memory (530) may include read-only memory (ROM) and/or random access memory (RAM) and/or hard disk and/or CD-ROM and/or DVD and/or other storage devices.

Figure 6:
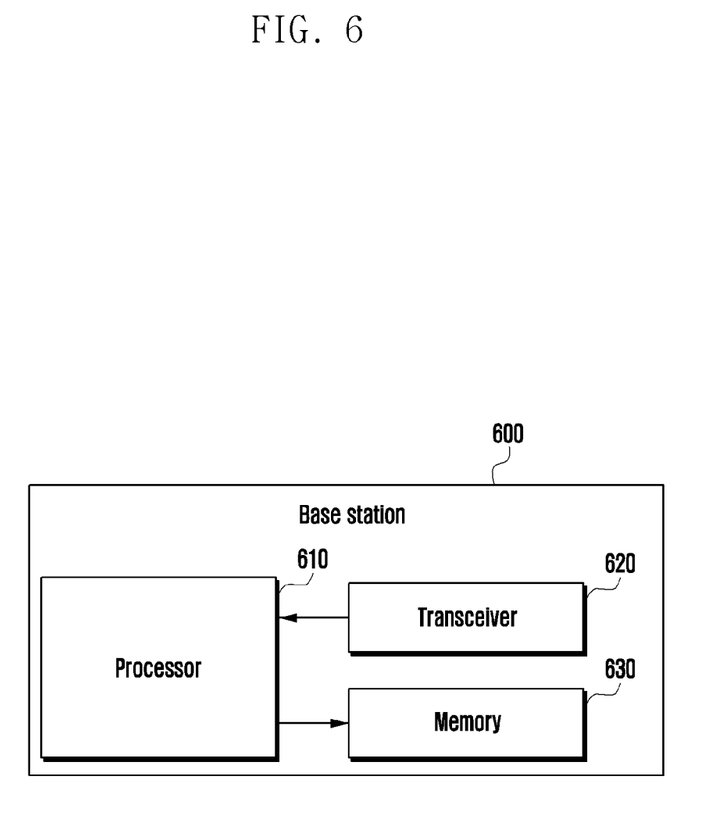
FIG. 6 illustrates a base station according to embodiments of the present disclosure.

FIG. 6 illustrates a base station according to embodiments of the present disclosure.

Referring to the FIG. 6, the base station (600) may include a processor (610), a transceiver (620) and a memory (630). However, all of the illustrated components are not essential. The base station (600) may be implemented by more or less components than those illustrated in FIG. 6. In addition, the processor (610) and the transceiver (620) and the memory (630) may be implemented as a single chip according to another embodiment.

The base station (600) may correspond to an MN or a SN according to embodiments of the present disclosure.

The aforementioned components will now be described in detail.

The processor (610) may include one or more processors or other processing devices that control the provided function, process, and/or method. An operation of the base station (600) may be implemented by the processor (610). The processor (610) may control a signal flow between each block to perform the provided function, process, and/or method according to the embodiments of the present disclosure.

The transceiver (620) may include an RF transmitter for up-converting and amplifying a transmitted signal, and an RF receiver for down-converting a frequency of a received signal. However, according to another embodiment, the transceiver (620) may be implemented by more or less components than those illustrated in components.

The transceiver (620) may be connected to the processor (610) and transmit and/or receive a signal. The signal may include control information and data. In addition, the transceiver (620) may receive the signal through a wireless channel and output the signal to the processor (610). The transceiver (620) may transmit a signal output from the processor (610) through the wireless channel.

The memory (630) may store the control information or the data included in a signal obtained by the base station (600). The memory (630) may be connected to the processor (610) and store at least one instruction or a protocol or a parameter for the provided function, process, and/or method. The memory (630) may include read-only memory (ROM) and/or random access memory (RAM) and/or hard disk and/or CD-ROM and/or DVD and/or other storage devices.

The embodiments of the present disclosure are applicable for LTE, NR and other cellular communication technologies and the reference to any one of these technologies in the disclosure is only for the purpose of illustration and not restricted by it.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a communication system, the method comprising:
receiving, from a first base station associated with a master cell group (MCG), a first message for configuring a second base station associated with a secondary cell group (SCG);
receiving, from the second base station, a second message including conditional primary secondary cell (PSCell) change (CPC) configuration including at least one configuration for at least one candidate PSCell and at least one condition to trigger an execution of CPC for each of the at least one candidate PSCell;
storing the CPC configuration; and
in case that a third message for releasing the SCG of the second base station is received from the first base station, releasing the SCG of the second base station and the stored CPC configuration.

2. The method of claim 1, wherein each of the at least one condition includes at least one measurement identifier (ID) associated with at least one measurement object and at least one report configuration.

3. The method of claim 1, wherein the first base station is associated with at least one of a new radio (NR) network or an evolved universal terrestrial radio access network (E-UTRAN), and wherein the second base station is associated with the NR network.

4. The method of claim 1, wherein the secondary cell group includes a PSCell and zero or more secondary cells of the second base station.

5. The method of claim 1, further comprising, in case that the CPC configuration is stored in the UE, skipping storing conditional handover (CHO) configuration.

6. The method of claim 1, wherein the second message is received via a radio resource control (RRC) signaling without involvement of the first base station.

7. A user equipment (UE) in a communication system, the UE comprising:
- a transceiver; and
- a controller coupled with the transceiver and configured to:
  - receive, from a first base station associated with a master cell group (MCG), a first message for configuring a second base station associated with a secondary cell group (SCG),
  - receive, from the second base station, a second message including conditional primary secondary cell (PSCell) change (CPC) configuration including at least one configuration for at least one candidate PSCell and at least one condition to trigger an execution of CPC for each of the at least one candidate PSCell,
  - store the CPC configuration, and
  - in case that a third message for releasing the SCG of the second base station is received from the first base station, release the SCG of the second base station and the stored CPC configuration.

8. The UE of claim 7, wherein each of the at least one condition includes at least one measurement identifier (ID) associated with at least one measurement object and at least one report configuration.

9. The UE of claim 7, wherein the first base station is associated with at least one of a new radio (NR) network or an evolved universal terrestrial radio access network (E-UTRAN), and wherein the second base station is associated with the NR network.

10. The UE of claim 7, wherein the secondary cell group includes a PSCell and zero or more secondary cells of the second base station.

11. The UE of claim 7, wherein the controller is further configured to skip storing conditional handover (CHO) configuration in case that the CPC configuration is stored in the UE.

12. The UE of claim 7, wherein the second message is received via a radio resource control (RRC) signaling without involvement of the first base station.

* * * * *